July 5, 1966   C. M. FREY   3,259,320
SECONDARY INJECTION THRUST VECTOR CONTROL SYSTEM
Filed April 29, 1963   2 Sheets-Sheet 1

INVENTOR.
Charles M. Frey.

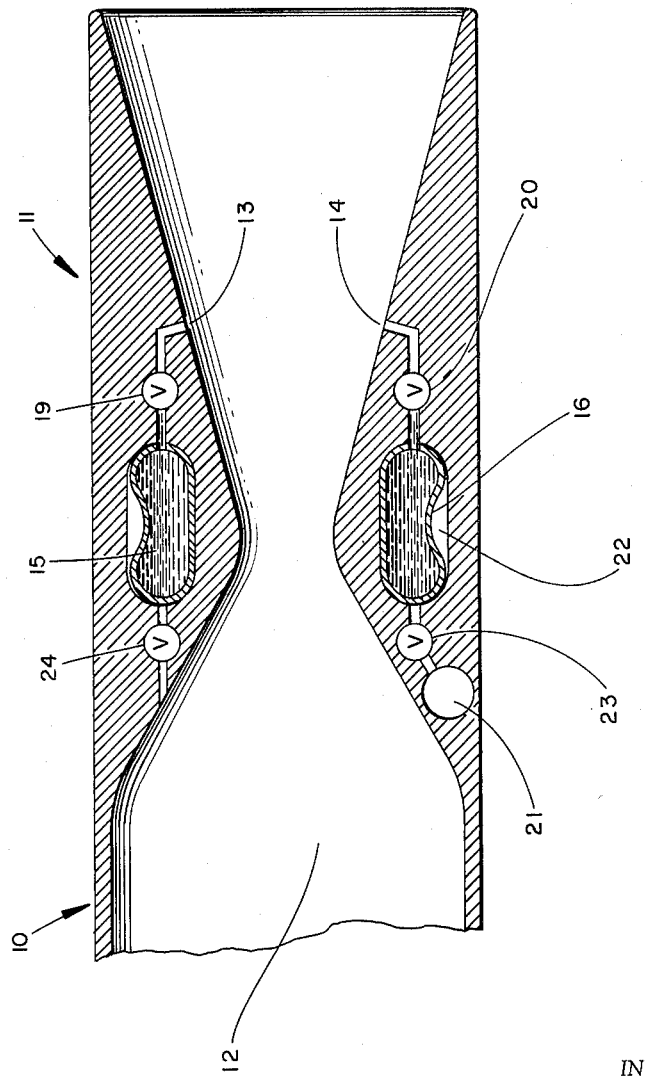

United States Patent Office 3,259,320
Patented July 5, 1966

3,259,320
SECONDARY INJECTION THRUST VECTOR
CONTROL SYSTEM
Christian M. Frey, Los Altos, Calif., assignor to United
Aircraft Corporation, East Hartford, Conn., a corporation of Delaware
Substituted for abandoned application Ser. No. 76,764,
Dec. 19, 1960. This application Apr. 29, 1963, Ser. No. 276,274
1 Claim. (Cl. 239—265.23)

This application is a substitute for previously abandoned patent application S.N. 76,764, filed December 19, 1960, entitled "Bladder Injection," by Christian M. Frey in which U.S. Patents 2,648,196, 2,753,801, 2,916,873, 2,968,919, and 2,939,281 were made of record.

This invention relates to a system for providing secondary-injection, thrust vector control of a reaction motor and more particularly relates to a novel system for providing liquid injectants at suitable pressures for injection into the exhaust gases being diverted.

In the use of thrust vector control systems on rocket motors by employing liquid injection at the nozzle, it has been the practice in the past to employ pressurized tanks for containing the injection liquid. These tanks, since they must be able to withstand relatively high pressures, are made of relatively high strength materials of substantial cross-section. The use of such tanks, as a consequence, add materially to the over-all weight of the vehicle, cutting down its effective payload.

In addition, certain vehicle maneuvers result in the liquid being concentrated in certain portions of the tank, thus leaving the injectant feeder-lines in the remaining portions of the tank devoid of the available liquid injectant. This results in liquid injectants not being uniformly available at all secondary injectors at a moment when full control capability is most essential.

In accordance with the present invention, a simple and reliable system of uniformly providing the fluid injectant at all levels at appropriate pressures is achieved by employing a flexible chamber or bladder to contain the injectant and squeezing the bladder by external pressure. This external pressure can be provided by the combustion chamber or by an independent source.

It is an object, therefore, of the present invention to provide a thrust vector control system wherein the injectant is uniformly available at all injectors at all times.

It is another object of the present invention to provide a thrust vector control system employing liquid injectant containers which do not materially detract from the overall payload of the reaction motor.

Other objects and many of the attendant advantages of this invention will be readily appreciated as the same becomes better understood by reference to tthe following detailed description when considered in connection with the accompanying drawings in which:

FIG. 3 shows a section view wherein the flexible container is located in a structural recess which can be pressurized by the combustion chamber or by a separate pressurizing means.

Figure 1:
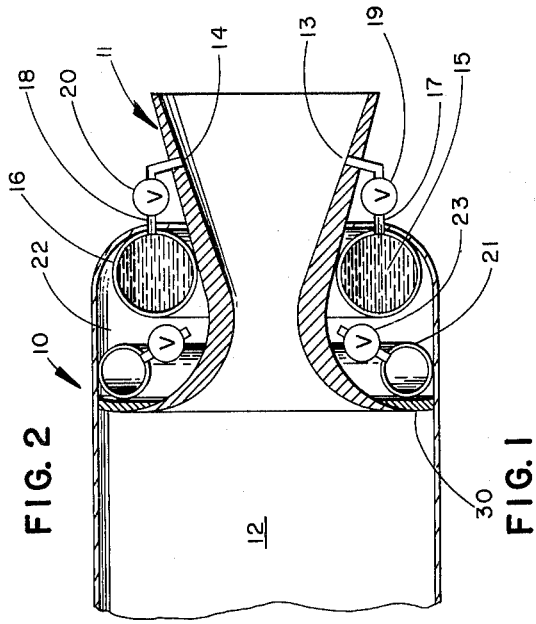
FIG. 1 shows a sectional view of a preferred embodiment of the present invention wherein the flexible liquid containers are located within a chamber separate from the combustion chamber.

Referring to FIG. 1, a reaction propulsion engine 10 has the rearwardly extending exhaust nozzle 11 through which the products of combustion generated in combustion chamber 12 are discharged to impart thrust to the system. In order to control the direction of flow of the exhausting gases, injection ports 13 and 14 are provided for the injection of thrust vector control liquids capable of diverting the thrust vector in accordance with the teachings of Wetherbee, Patent Number 2,943,821. The fluid source 15 contained in the toroidal flexible bag 16 is caused to flow through feeder-lines 17 and 18 by selectively regulating valves 19 and 20 respectively whereupon the injectant fluid is discharged into the high-velocity exhaust stream at ports 13 and 14 respectively.

In the past it has been the practice to store the liquid injectant in source 15 in a high pressure tank which was internally pressurized by gases which force the liquid injection medium into the injection ports. However, in employing tanks of constant volume, it is difficult to arrange feeder lines so that the liquid injectant will be uniformly available no matter what the attitude or maneuver of the reaction motor. For example, when the reaction motor is negotiating a turn in space, incompressible fluid may flow to one side of the tank leaving virtually no liquid available to feeder lines on the opposite side. However, in the present invention, a fluid container 16 is not a tank made of a rigid material such as metal, but, instead, is comprised of a flexible substance which will continually collapse about the injection medium 15 until said medium is entirely consumed. Consequently, the incompressible liquid is equally available to all feeder pipes at all times under substantially the same pressure no matter what the maneuver of the vehicle at the moment.

In order to pressurize the fluid 15 contained in the flexible bag 16 it is necessary to provide a surrounding environment at a pressure in excess of that found in the exhaust nozzle at the injectors 13 and 14. In this embodiment, an independent pressurizing chamber 22 is employed which is pressurized by a gas from tank 21 by opening valve 23. The pressure created in chamber 22 is transmitted to the liquid 15 through the collapsible bag 16. Consequently, in order to negotiate an upward turn with the vehicle, opening valve 19 will cause liquid 15 to inject into the high velocity exhaust emerging from the nozzle 11 whereupon the gases will be diverted upwardly resulting in a moment about the center of gravity turning the nose of the vehicle upward.

Figure 2:
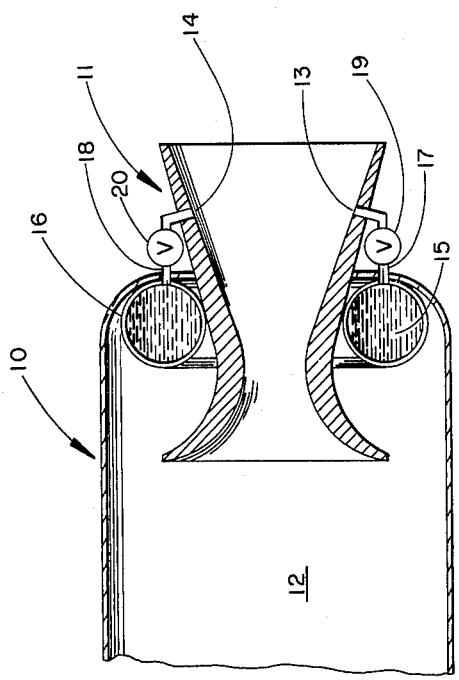
FIG. 2 shows a sectional view of a preferred embodiment of the present invention wherein the flexible container is located within the combustion chamber.

However, it has also been found that in certain instances it is not necessary to provide separate pressurization tanks 21 but, as shown in FIG. 2, the collapsible bags may be wholly within the combustion chamber itself and pressurizing is effected by the combustion chamber gases. This is possible because the pressure of the exhausting combustion gases passing by ports 13 and 14 is substantially lower than in the combustion chamber, thus providing the necessary pressure differential to cause the liquid to flow through valves 19 and 20 when opened.

Referring now to FIG. 3, there is shown a combination system wherein chamber 22 can be pressurized either by an independent gas source 21 by opening valve 23 or may be pressurized by combustion chamber gases by opening valve 24. In the configuration as shown in FIG. 3, it is apparent that the flexible container or bladder 16 can have a minimum contact with the combustion chamber and be subjected to less heating and possibility of failure. Consequently, when the gases in a specific system are found to be particularly corrosive to suitable flexible materials, it is desirable to insulate the bladder 16 from the combustion chamber in such a manner. In extreme cases, it may be necessary to circulate cooling fluids through chamber 22 or in proximity to chamber 22 or use ablative materials on the bladder surface to minimize the heating. In most instances, however, the bladder 16 may be made of an elastomeric material such as a filled rubber which is often used as a solid reaction motor liner. The thickness of a bladder of this material suitable for most applications should run from 0.06 inch to 0.50 inch. It is, of course, quite possible to use a wide variety of other materials of greater or lesser thickness depending upon the particular requirements of the system involved.

Although the thrust vector control system of the present invention is most uniquely adapted for use in conjunction with solid propellant motors, it may, of course, be used in any reaction motor system.

While there has been shown and described the fundamental novel features of this invention as applied to the preferred embodiments, it will be understood that various omissions and substitutions and changes in the form and details of the device illustrated and its operation may be made by those skilled in the art without departing from the spirit of the invention. It is the intention, therefore, to be limited only by the scope of the following claim and reasonably equivalence thereof.

I claim:

A rocket motor thrust vector control system comprising a combustion chamber for generating combustion gases, a nozzle in communication with the aft end of said combustion chamber, said nozzle having a convergent portion and a divergent portion downstream of said convergent portion, liquid injection ports in said nozzle downstream from said convergent portion for injection of liquid into said combustion gases to divert the flow thereof, a flexible container for said liquid mounted within said combustion chamber and in pressure transmitting relationship with said combustion gases, said flexible container being capable of collapsing under the action of said combustion gases whereby the liquid is pressurized by compression of said flexible container by said combustion gases, liquid transmitting means connecting said flexible container to said injection ports and means for varying the flow of the liquid to said injection ports, whereby said fluid is uniformly available for injection at all times during the operation of said motor and the formation of voids in said fluid is prevented.

References Cited by the Examiner

UNITED STATES PATENTS

| | | | |
|---|---|---|---|
| 2,916,873 | 12/1959 | Walker | 60—35.54 |
| 2,924,359 | 2/1960 | Beremand. | |
| 2,943,821 | 7/1960 | Wetherbee. | |
| 3,045,596 | 7/1962 | Rae | 60—35.54 X |
| 3,066,485 | 12/1962 | Bertin et al. | 60—35.54 |

MARK NEWMAN, *Primary Examiner.*

SAMUEL LEVINE, *Examiner.*

T. BLUMENSTOCK, A. L. SMITH, *Assistant Examiners.*